United States Patent
Huang et al.

(10) Patent No.: US 7,634,672 B2
(45) Date of Patent: Dec. 15, 2009

(54) POWER SAVING METHOD OF CENTRAL PROCESSING UNIT

(75) Inventors: Wen-Juin Huang, Hsin-Tien (TW); Chung-Ching Huang, Hsin-Tien (TW)

(73) Assignee: Via Technologies Inc., Taipei County (TW)

( * ) Notice: Subject to any disclaimer, the term of this patent is extended or adjusted under 35 U.S.C. 154(b) by 500 days.

(21) Appl. No.: 11/505,973

(22) Filed: Aug. 18, 2006

(65) Prior Publication Data

US 2007/0157039 A1 Jul. 5, 2007

(30) Foreign Application Priority Data

Jan. 3, 2006 (TW) .............................. 95100225 A

(51) Int. Cl.
*G06F 1/26* (2006.01)
(52) U.S. Cl. .................... 713/300; 713/320; 713/323
(58) Field of Classification Search .............. 713/300
See application file for complete search history.

(56) References Cited

U.S. PATENT DOCUMENTS 6,085,330 A * 7/2000 Hewitt et al. ............... 713/322
6,311,281 B1 * 10/2001 Pole et al. .................. 713/322

OTHER PUBLICATIONS

PCT application publication No. WO 98/44405, dated Oct. 8, 1998.*

\* cited by examiner

*Primary Examiner*—Nitin C Patel
(74) *Attorney, Agent, or Firm*—Rosenberg, Klein & Lee

(57) ABSTRACT

A power saving method applied to a central processing unit under a non-snooping sleeping state with a bus master request from a peripheral device is presented. In accordance with the present invention, first prohibit the central processing unit from fetching instruction. Then drive the central processing unit entering a snooping sleeping state and enabling the arbiter for transferring the bus master request to the central processing unit. After the central processing unit completes the bus master request, the arbiter is disabled and the central processing unit is driven to leave the snooping sleeping state and return back to the non-snooping sleeping state. Therefore, the power consumed by the central processing unit is reduced so as to save power.

17 Claims, 4 Drawing Sheets

POWER SAVING METHOD OF CENTRAL PROCESSING UNIT

FIELD OF THE INVENTION

The present invention relates to a power saving method applied to a central processing unit and a system therefore, especially to a processing method for a central processing unit that is in a non-snooping sleeping state while receiving a bus master request from a peripheral device.

BACKGROUND OF THE INVENTION

Except petroleum, electric power is the most important power resource in daily life. Almost every household appliance requires electricity to operate, such as lighting, TV, air conditioner, etc. But before any breakthrough on exploring new power source that is more efficient and economic is made, the best measure is to reduce power consumption. For example, power consumption of desktops or notebooks is one of major concerns of R&D staffs and users, especially for notebooks. Besides improvement of battery capacity, another way is to develop more power-saving notebooks.

To improve power efficiency, computer systems such as desktops or notebooks are provided with power management systems. The most commonly seen is ACPI (Advanced Configuration and Power Interface). The power states defined by the ACPI include: Global system state, Sleeping state, Device power state and Processor power state. Global system state defines the overall power state of the computer system. Sleeping state defines various power saving states when computer system has few loading. Device power state defines various power states of the peripheral devices in the computer system. Processor power state defines power levels of the CPU (central processing unit). There are four states defined in Processor power state: C0, C1, C2 and C3. According to the working status of the CPU, the operating system drives the CPU to enter into the proper power state.

C0 state is the normal processing state. In C0 state, the CPU executes instructions in normal. C1, C2, and C3 states are different levels of power-saving states, known as sleeping states. It takes the shortest time for the CPU to wake up from a halt state (C1) and resume full performance to C0 state. Different to C1 state, C2 state is more power saving and the CPU only executes part of functions in this state, such as snooping function. In C2 state, the CPU can still snoop bus master requests and further process these requests so that the peripheral devices of the computer system can access data in the memory. In C3 state, the CPU is almost turned off without any loading. Therefore it's the most power saving state.

Refer to FIG. 1, which illustrates a state transfer diagram of prior-art ACPI. When the CPU is in C1, C2 or C3 state and the system chip receives an interrupt from the peripheral device, the CPU returns back to C0 state to process the interrupt. Moreover, when the CPU is in C3 state, once the peripheral device issues a bus master request, the CPU also returns back to C0 state to process the bus master request. That is because C3 state is a sleeping state without snooping function. The CPU needs to wake up from C3 state and return back to C0 state for snooping events so as to process the bus master request. Otherwise, the peripheral devices can not access data inside the memory.

After the bus master request is completed, the CPU needs to stay in C0 state until the conditions for entering C3 state are satisfied. Then the operating system drives the CPU returning to C3 state. However, while in C2 state, the CPU is able to snoop the bus master request. Thus the conventional way of returning back to C0 state for processing the bus master request makes the CPU consume more power.

SUMMARY OF THE INVENTION

Therefore the present invention provides a power saving method for a CPU. When the CPU is in a non-snooping sleeping state and the peripheral device issues a bus master request, the CPU is driven to wake up from the non-snooping sleeping state and enter a snooping sleeping state so that the CPU may snoop the bus master request and return to the non-snooping sleeping state after the request is completed. In such way power consumption of the CPU can be saved.

The present invention is applied to the condition that the CPU is under a non-snooping sleeping C3 state and a peripheral device issues a bus master request. First, assert a stop signal to prohibit the CPU from fetching instructions. Then, assert a first control signal to drive the CPU waking up from C3 state. Next a second control signal is asserted to drive the CPU entering to C2 state that allows snooping and an arbiter is enabled for transferring the bus master request to the CPU. After the bus master request is completed, the arbiter is disabled and a third control signal is asserted to drive the CPU waking up from C2 state. Then consequently assert a fourth control signal to drive the CPU back to C3 state so as to save power.

After returning back to C3 state, if the peripheral device issues an interrupt to the CPU, the CPU wakes up from C3 state and enters to C0 state to execute instructions by receiving a first control signal. And a resume signal is asserted to the CPU while the arbiter is enabled for transferring the interrupt to the CPU for processing.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

The present invention relates to a power saving method for a CPU that is in C3 state while receiving a bus master request. The present invention drives the CPU entering to C2 state to snoop and process the bus master request.

Figure 1:
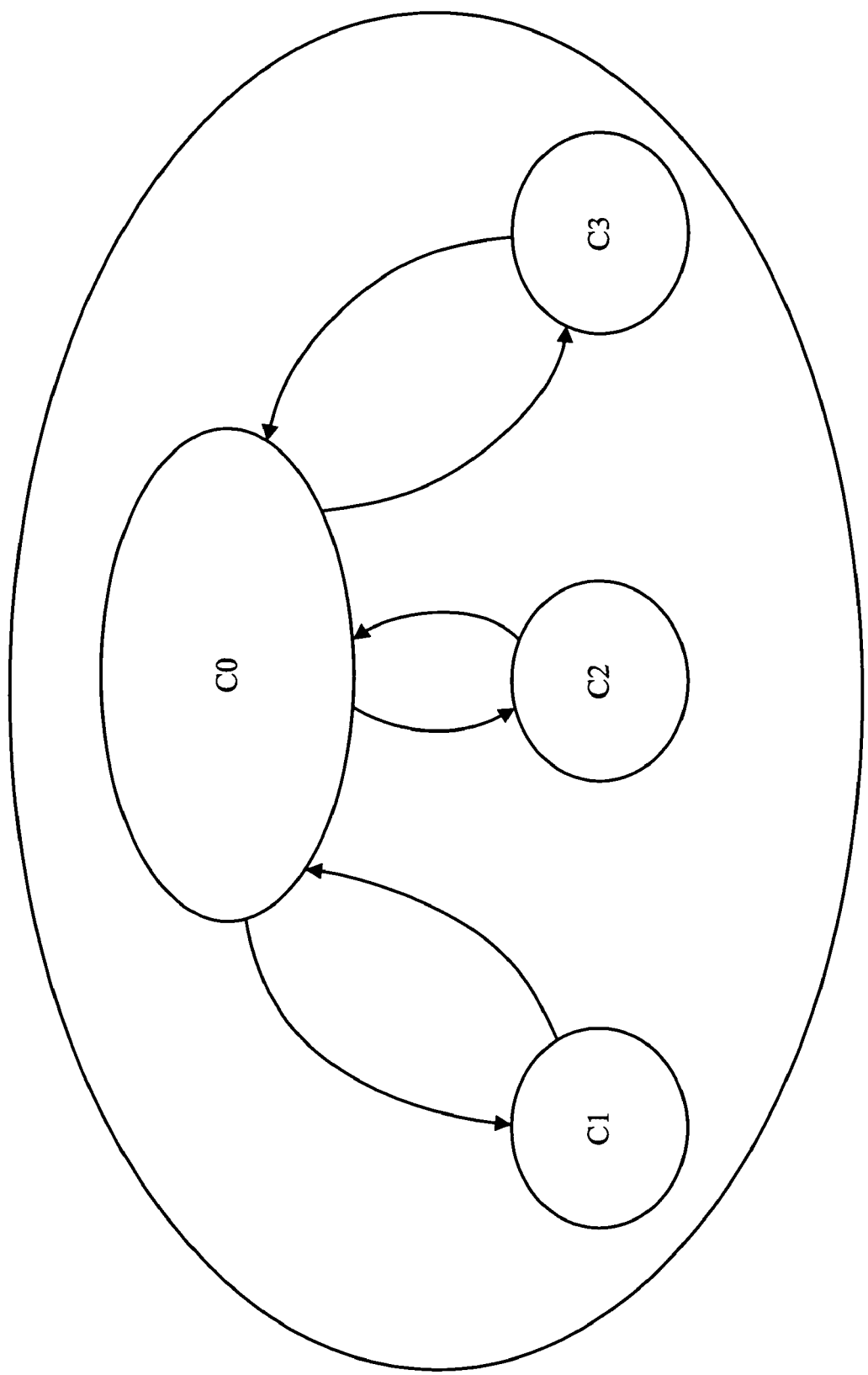
FIG. 1 is a schematic state transfer diagram which depicts processor states of the Advanced Configuration and Power Interface of a prior art.
Figure 2:
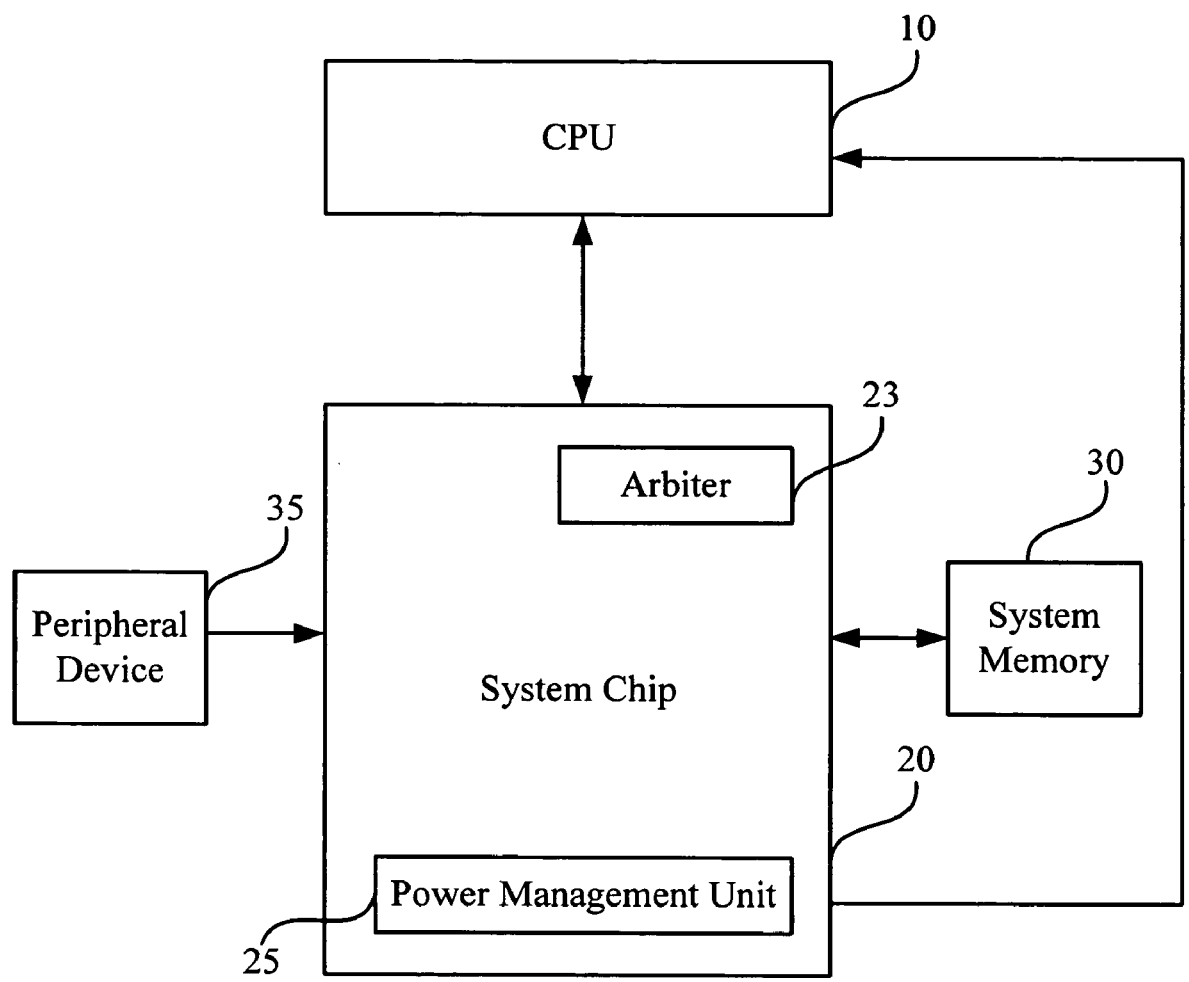
FIG. 2 is a block diagram of an embodiment in accordance with the present invention.

Refer to FIG. 2, which illustrate a block diagram of an embodiment of the present invention. As shown in FIG. 2, the present invention includes a system chip 20 coupled to a CPU 10. The system chip 20 includes an arbiter 23 and a power management unit 25, and is further coupled to a system memory 30 and a peripheral device 35. When the peripheral device 35 requests to read data from the system memory 30, the peripheral device 35 will issue a bus master request to the system chip 20. Then the system chip 20 will transfer the bus master request to the CPU 10 through the arbiter 23 for snooping and processing the request. The power management unit 25 of the system chip 20 is provided to issue control commands to the CPU 10 in order to drive the CPU 10 into different power states according to the working condition.

When the operating system detects that the CPU 10 has low work loading and the conditions for entering C3 state is met, the operating system then drives the CPU 10 entering to C3 state. In order to avoid the system chip 20 transferring the bus master request or the interrupt event to the CPU 10 through the arbiter 23 when the CPU 10 is in C3 state, the operating system will drive the system chip 20 to disable the arbiter 23 until the CPU 10 leaves C3 state. To control the arbiter 25, the operating system will issue a control command to the system chip 10. Then the system chip 20 transfers an I/O response to the CPU 10 and enables the arbiter 23 according to the control command. The CPU 10 will not fetch and execute the instruction of the operating system until receiving the I/O response.

As mentioned above, the CPU 10 has to wait a period of time till the conditions of entering C3 state are met, then the CPU 10 is able to enter C3 state. In the case that the CPU 10 completes the bus master request or the interrupt event and has nothing to do later, the CPU 10 must waste redundant time and power in C0 state before returning to C3 state. However, the CPU 10 is also able to snoop the bus master request in C2 state. If the CPU 10 may jump from C3 state to C2 state to process the bus master request and return to C3 state after the request is completed, power can be saved comparing to processing in C0 state and waiting for returning to C3 state.

Due to that the power management unit 25 of the system chip 20 allows the CPU 10 to transfer between C0/C2 and C0/C3 only, it is not possible to transfer between C2/C3 directly. In order to make the CPU 10 transfer from C3 to C2 state, the CPU 10 must transit to C0 state in transient. That is, the CPU 10 has to transit to C0 state from C3 state, then transit to C2 state from C0 state. In the same way, the CPU 10 returns to C3 state from C2 state transiting through C0 state. Notice that the CPU 10 does not have to execute any instruction in C0 state, which is only a transient state between C2 and C3 states. Therefore, the system chip 20 must prohibit the CPU 10 from fetching instruction and enable or disable the arbiter 23 correspondingly.

Provided with the facts, the system chip 20 in the present invention asserts a stop signal to the CPU 10 to prohibit the CPU 10 from fetching instruction before the CPU 10 transiting to C0 state. Then the power management unit 25 of the system chip 20 drives the CPU 10 to enter to C2 state for snooping the bus master request. After the request is completed, the power management unit 25 drives the CPU 10 to leave C2 state and return to C3 state transiting through C0 state. When the system chip 20 receives an interrupt event, the system chip 20 asserts a resume signal and the CPU enters to C0 state to fetch and execute instructions of the operating system.

Figure 3:
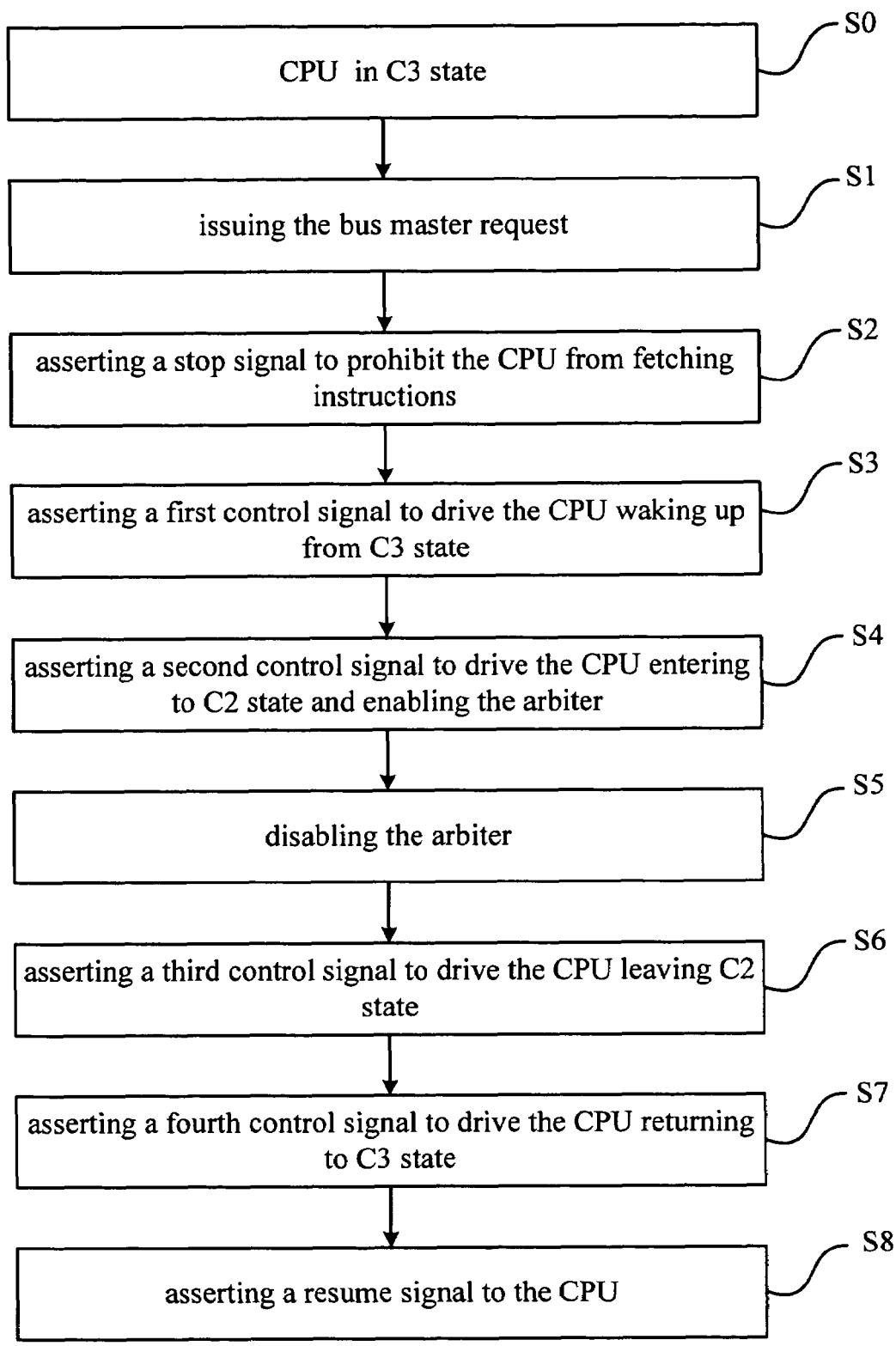
FIG. 3 is a flow chart of an embodiment in accordance with the present invention.

A flowchart of an embodiment in the present invention is shown in FIG. 3. In step S0, the CPU 10 is in C3 state and the arbiter 25 is disabled. Next refer to step S1, a peripheral device 35 issues the bus master request to the system chip 20. In step S2, the system chip 20 asserts a stop signal to the CPU 10 to prohibit CPU 10 from fetching instructions. The system chip 20 and the CPU 10 of the present invention are disposed with corresponding pins. The system chip 20 asserts a high-level signal through its pin to the corresponding pin on the CPU 10 to represent the stop signal that prohibits the CPU 10 from fetching instructions. If a low-level signal is asserted from the system chip 20 to the CPU 10, such case is a resume signal that allows the CPU 10 to fetch instructions again.

Then in step S3, a power management unit 25 of the system chip 20 asserts a first control signal to drive the CPU 10 leaving C3 state and entering to C0 state. Due to the stop signal asserted by the system chip 20 in step S2, although the CPU 10 is in C0 state, instructions of the operating system will not be fetched or executed. Thus the system chip 20 is unable to enable the arbiter 23 and transfer the bus master request to the CPU 10.

Next the power management unit 25 goes to step S4, asserting a second control signal to drive the CPU 10 leaving C0 state and entering to C2 state, which is provided with snooping function. After the CPU 10 entering to C2 state, the system chip 20 automatically enables the arbiter 23 to transfer the bus master request to the CPU 10 for snooping.

When the system chip 20 detects that the CPU 10 has completed the bus master request, the system chip 20 will disable the arbiter 23 in step 5. Next, as shown in step S6, the power management unit 25 of the system chip 20 asserts a third control signal to drive the CPU 10 leaving C2 state and entering to C0 state. Until now the CPU 10 will not fetch any instructions yet.

Refer to step S7, the system chip 20 asserts a fourth control signal to drive the CPU 10 leaving C0 state and returning to C3 state. At last, the system chip 20 goes to step S8, asserting a resume signal to the CPU 10 to recover the status of the CPU 10 as in step S0. Later, if the peripheral device 35 issues a bus master request again, repeat step S2 to step S8. If the event that the system chip 20 receives is an interrupt, the CPU 10 needs to wake up from C3 state and returns to normal processing state C0 state to process the interrupt. Therefore the system chip 20 asserts a first control signal to drive the CPU 10 waking up from C3 state and entering to C0 state, and the arbiter 23 is enabled for transferring the interrupt to the CPU 10. Then the CPU 10 may process the interrupt event. In this case no stop signal is asserted, therefore the CPU 10 will not be prohibited from fetching instructions of the operating system.

Figure 4:
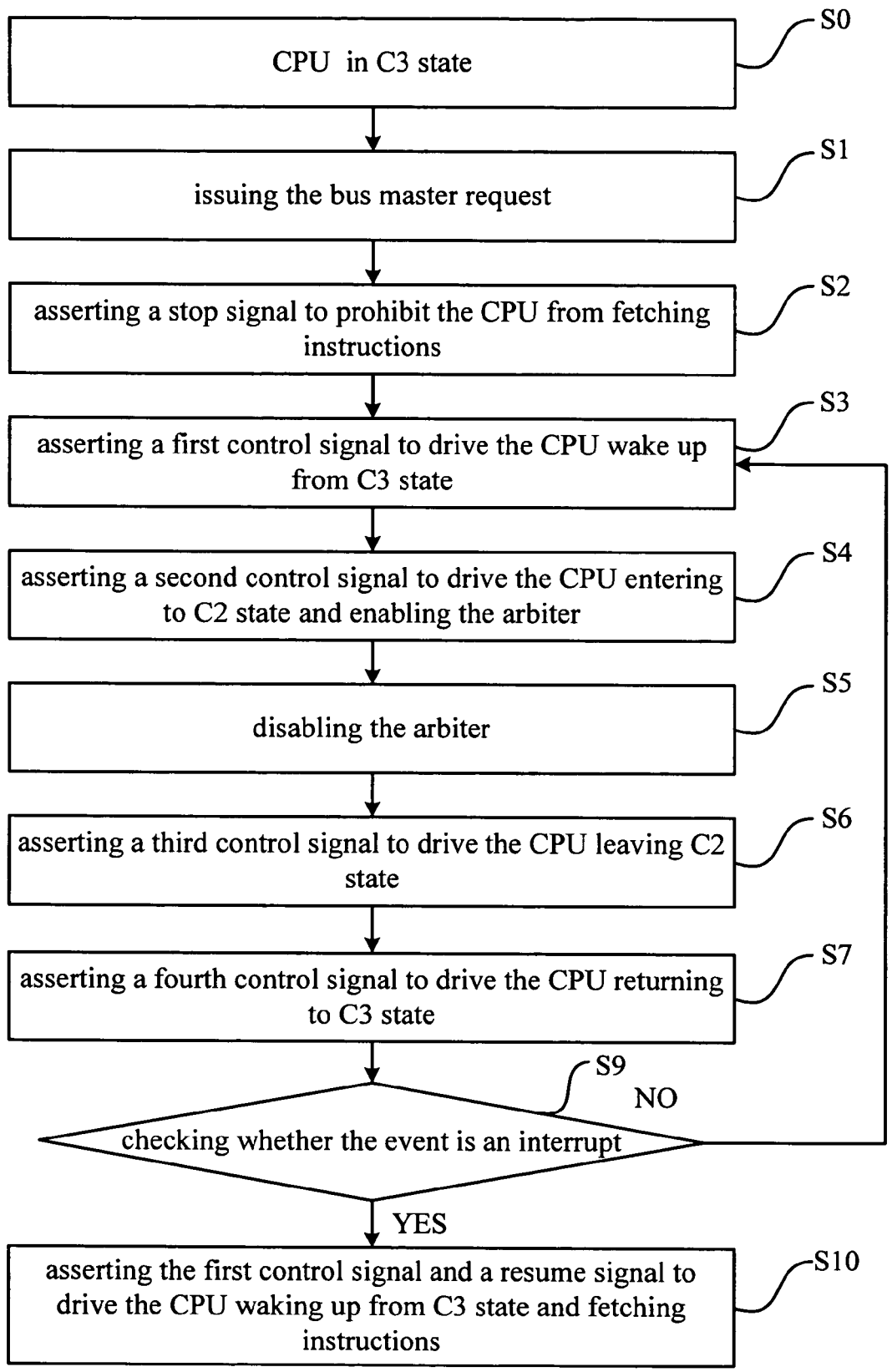
FIG. 4 is a flow chart of another embodiment in accordance with the present invention.

Refer to FIG. 4 now. Different to the previous embodiment in FIG. 3, which goes to step S8 in which the resume signal is asserted after the CPU 10 returns to C3 state in step S7, the embodiment in FIG. 4 will go to step S9 to determine whether an interrupt event is presented after step S7. If the peripheral device 35 issues a bus master request again, repeat step S3 to step S7 to allow the CPU 10 snooping the request in C2 state. If the peripheral device 35 issues an interrupt, the CPU 10 has to wake up from C3 state and enter to C0 state. The system chip 20 goes to step S10, asserting the first control signal to drive the CPU 10 leaving C3 state and entering to C0 state. Moreover, the system chip 20 then asserts the resume signal to the CPU 10 so as to allow the CPU 10 fetching instructions. Thus the CPU 10 will fetch and execute instructions of the operating system, and the system chip 20 will enable the arbiter 23 to transfer the interrupt to the CPU 10 for processing.

In summary, when the CPU is in the non-snooping C3 state and the peripheral device issues the bus master request, a power saving method of the CPU in accordance with the present invention prohibits the CPU from fetching instructions, then drives the CPU waking up from C3 state and entering to C2 state that allows snooping function by transiting through C0 state in between. Thus the CPU is able to snoop the bus master request. After the bus master request is completed, the CPU then returns from C2 state to C3 state by transiting through C0 state. By driving the CPU leaving C3 state to snoop the bus master request in C2 state and then returning to the C3 state, power can be saved in the present invention.

Additional advantages and modifications will readily occur to those skilled in the art. Therefore, the present invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A power saving method applied to a CPU that is in a C3 state and having a peripheral device which issues a bus master request, comprising the steps of:
    asserting a stop signal to prohibit said CPU from fetching instructions;
    asserting a first control signal to drive said CPU to leave said C3 state and transit to a C0 state, wherein said CPU continuing to be prohibited from fetching instructions; and
    asserting a second control signal to drive said CPU to enter a C2 state from said C0 state wherein said CPU is prohibited from fetching instructions,
    wherein said CPU returns to said C3 state after leaving said C2 state.

2. The method as claimed in claim 1, wherein said stop signal is asserted by a pin disposed in a system chip to a corresponding pin of said CPU.

3. The method as claimed in claim 1, further comprises a step of enabling an arbiter to transfer said bus master request to said CPU after said CPU is in C2 state.

4. The method as claimed in claim 3, wherein after said CPU completes said bus master request, the method further comprises:
    disabling said arbiter;
    asserting a third control signal to drive said CPU to leave said C2 state; and
    asserting a fourth control signal to drive said CPU to return to said C3 state.

5. The method as claimed in claim 4, wherein said steps of asserting said first control signal, said second control signal, said third control signal and said fourth control signal are driven by a power management unit of a system chip.

6. The method as claimed in claim 4, wherein said CPU transits to said C0 state wherein said CPU is prohibited from fetching instructions after leaving said C2 state, and transits to said C0 state after leaving said C3 state.

7. The method as claimed in claim 4, wherein after said CPU returns to said C3 state and said peripheral device issues an interrupt event, the method further comprises:
    asserting said first control signal to drive said CPU to leave said C3 state and enter a C0 state;
    asserting a resume signal to said CPU; and
    enabling said arbiter to transfer said interrupt event to said CPU for processing.

8. The method as claimed in claim 4, wherein after said CPU returns to said C3 state and said peripheral device issues said bus master request again, asserting said first control signal and said second control signal to said CPU and enabling said arbiter to snoop said bus master request; after said bus master request is completed, disabling said arbiter and asserting said third control signal and said fourth control signal to said CPU.

9. A power saving method applied to a CPU that is in a non-snooping sleeping state and having a peripheral device which issues a bus master request, comprising the steps of:
    asserting a stop signal to prohibit said CPU from fetching instructions;
    asserting a first control signal to drive said CPU to leave said non-snooping sleeping state; and
    asserting a second control signal to drive said CPU to enter a snooping sleeping state that allows snooping function,
    wherein said CPU transits to a normal processing state, said CPU being prohibited from fetching instructions after leaving said non-snooping sleeping state.

10. The method as claimed in claim 9, wherein said stop signal is asserted by a pin disposed in a system chip to a corresponding pin of said CPU.

11. The method as claimed in claim 9, further comprises a step of enabling an arbiter to transfer said bus master request to said CPU after said CPU is in snooping sleeping state.

12. The method as claimed in claim 11, wherein after said CPU completes said bus master request, the method further comprises:
    disabling said arbiter;
    asserting a third control signal to drive said CPU to leave said snooping sleeping state; and
    asserting a fourth control signal to drive said CPU to return to said non-snooping sleeping state.

13. The method as claimed in claim 12, wherein said CPU transits to said normal processing state, said CPU being prohibited from fetching instructions after leaving said snooping sleeping state.

14. The method as claimed in claim 12, wherein said steps of asserting said first control signal, said second control signal, said third control signal and said fourth control signal are driven by a power management unit of a system chip.

15. The method as claimed in claim 12, wherein after said CPU returns to said non-snooping sleeping state and said peripheral device issues an interrupt event, the method further comprises:
    asserting said first control signal to drive said CPU to leave said non-snooping sleeping state and enable said normal processing state;
    asserting a resume signal to said CPU; and
    enabling said arbiter to transfer said interrupt event to said CPU for processing.

16. The method as claimed in claim 12, wherein after said CPU returns to said non-snooping sleeping state and said peripheral device issues said bus master request again, asserting said first control signal and said second control signal to said CPU and enabling said arbiter to snoop said bus master request; after said bus master request is completed, disabling said arbiter and asserting said third control signal and said fourth control signal to said CPU.

17. The method as claimed in claim 9, wherein said non-snooping sleeping state is C3 state and said snooping sleeping state is C2 state and said normal processing state is C0 state.

* * * * *